US006981207B1

(12) United States Patent
Bakman et al.

(10) Patent No.: US 6,981,207 B1
(45) Date of Patent: Dec. 27, 2005

(54) AUTOMATIC DOCUMENTATION OF CONFIGURABLE SYSTEMS BY OUTPUTTING EXPLANATORY INFORMATION OF CONFIGURATION PARAMETERS IN A NARRATIVE FORMAT AND CONFIGURATION PARAMETERS DIFFERENCES

(75) Inventors: Alexander Bakman, Hampton, NH (US); Daniel Sabin, Madbury, NH (US); Tudor Hulubei, Hampton, NH (US); Shalom Wertsberger, South Portland, ME (US)

(73) Assignee: Ecora Software Corporation, Portsmouth, NH (US)

( * ) Notice: Subject to any disclaimer, the term of this patent is extended or adjusted under 35 U.S.C. 154(b) by 303 days.

(21) Appl. No.: 09/481,069

(22) Filed: Jan. 11, 2000

(51) Int. Cl.[7] .................................................. G06F 7/00
(52) U.S. Cl. ........................ 715/500; 715/513; 715/531
(58) Field of Search ............................... 715/500, 501.1, 715/513, 531, 721; 717/123; 709/200–203; 707/500, 501, 513, 531

(56) References Cited

U.S. PATENT DOCUMENTS

| 5,638,509 | A | * | 6/1997 | Dunphy et al. ................ 714/20 |
| 5,708,798 | A | | 1/1998 | Lynch et al. |
| 5,732,221 | A | | 3/1998 | Feldon et al. |

(Continued)

FOREIGN PATENT DOCUMENTS

| EP | 0820013 A1 | 1/1998 |
| EP | 0903889 A2 | 3/1999 |
| WO | PCT/US97/21218 | 5/1998 |

OTHER PUBLICATIONS http://www.c2c.com/products/inlook.htm "Messaging Software—InLook", Oct. 28, 1998, p. 1–2.

Boi Faltings and Eugene C Freuder : "Guest Editor Introduction: Configuration", IEEE Intelligent Systems & their applications, Jul./Aug. 1998, pp. 32–33; published by IEEE Computer Society, Los Alamitos, CA USA.

Daniel Sabin and Rainer Weigel: "Product Configuration Framework—A Survey", IEEE Intelligent Systems & their applications, Jul./Aug. 1998, pp. 42–49; published by IEEE Computer Society, Los Alamitos, CA USA.

Gerhard Fleischandrel, Gerhard E. Friedrich, Alois Haselbock, Herwig Schreiner and Markus Stumptner: "Configuring Large Systems Using Generative Contraint Satisfaction", IEEE Intelligent Systems & their applications, Jul./Aug. 1998, pp. 59–68; published by IEEE Computer Systems Society, Los Alamitos, CA USA.

*Primary Examiner*—Stephen S. Hong
*Assistant Examiner*—Cesar B. Paula
(74) *Attorney, Agent, or Firm*—Roylance, Abrams, Berdo, Goodman, L.L.P.

(57) ABSTRACT

An automatic documentation generation and management system and method, for documenting configurable systems such as complex software applications and hardware systems is disclosed. The method retrieves configuration parameters from the configurable system and utilizes them to automatically generate an explanatory document specific to the configured system. The invention also discloses a documentation appliance system, which is a dedicated documentation server coupled to the configurable system via a communication network, preferably via an Intranet. In yet another alternative, the invention may be practiced by integrating code for automatic documentation generation within the configurable system program.

99 Claims, 13 Drawing Sheets

U.S. PATENT DOCUMENTS

| | | | |
|---|---|---|---|
| 5,774,667 A | | 6/1998 | Garvey et al. |
| 5,815,717 A | | 9/1998 | Stack |
| 5,901,286 A | * | 5/1999 | Danknick et al. ........... 709/203 |
| 5,918,233 A | | 6/1999 | La Chance et al. |
| 5,924,109 A | | 7/1999 | Ackerman et al. |
| 5,926,463 A | | 7/1999 | Ahearn et al. |
| 5,953,526 A | | 9/1999 | Day et al. |
| 5,978,842 A | * | 11/1999 | Noble et al. ................ 709/218 |
| 6,003,078 A | * | 12/1999 | Kodimer et al. ............ 709/224 |
| 6,021,429 A | * | 2/2000 | Danknick ................... 709/208 |
| 6,021,437 A | | 2/2000 | Chen et al. |
| 6,038,567 A | * | 3/2000 | Young ....................... 707/103 |
| 6,044,399 A | * | 3/2000 | Elledge ...................... 709/220 |
| 6,052,367 A | * | 4/2000 | Bowater et al. ............ 370/352 |
| 6,061,603 A | * | 5/2000 | Papadopoulos et al. ....... 700/83 |
| 6,061,692 A | * | 5/2000 | Thomas et al. ............. 707/200 |
| 6,065,116 A | * | 5/2000 | Isaacson et al. ............... 713/1 |
| 6,094,644 A | * | 7/2000 | Hillson et al. .............. 705/400 |
| 6,212,494 B1 | * | 4/2001 | Boguraev ...................... 704/9 |
| 6,272,508 B1 | * | 8/2001 | Dyne et al. ................. 715/530 |
| 6,507,855 B1 | * | 1/2003 | Stern .......................... 715/513 |
| 6,542,897 B2 | * | 4/2003 | Lee ............................ 707/102 |
| 6,629,134 B2 | * | 9/2003 | Hayward et al. ........... 709/217 |

* cited by examiner

```
class Organization
{
  private:
    string m_name;          // The name of the organization.
    vector<Site> m_sites;   // The sites making up the organization.
  public:
    Organization();         // The constructor of the Organization.
    void post();            // Fill the fields.
    void validate();        // Check the validity of the rules.
    void document();        // Generate documentation.
};
```
— 511 class Organization
— 516 string m_name
— 512 vector<Site> m_sites
— 513 Organization()
— 515 void validate()

510

```
class Site
{
  private:
    string m_name;              // The name of the site.
    vector<Server> m_servers;   // The servers making up the site.
    vector<Protocol> m_protocols; // The protocols supported by the site.
  public:
    Site();                     // The constructor of the Site.
    void post();                // Fill the fields.
    void validate();            // Check the validity of the rules.
    void document();            // Generate documentation.
};
```
— 526 string m_name
— 524 vector<Server> m_servers
— 522 Site()
— 525 void validate()

520

```
class Server
{
  private:
    string m_name;       // The name of the server.
    int m_mailboxes;     // The number of mailboxes.
    int m_diskSpace;     // The amount of disk space on the server.
  public:
    Server();            // The constructor of the Server.
    void post();         // Fill the fields.
    void validate();     // Check the validity of the rules.
    void document();     // Generate documentation.
};
```
— 532 Server()
— 535 void validate()

530

```
class Protocol
{
  private:
    string m_name;           // The protocol name.
    bool m_enabled;          // The status of this protocol.
    bool m_allowAnonymous;   // Whether or not this protocol
                             // allows anonymous access.
  public:
    Protocol();              // The constructor of the Protocol.
    void post();             // Fill the fields.
    void validate();         // Check the validity of the rules.
    void document();         // Generate documentation.
};
```
— 542 Protocol()
— 545 void validate()

```
void
Site::document()
{
Sever *s;
Protocol *p;

TOC_Entry(m_name, "site description", get_current_location());

Index_Entry(m_name, get_current_location());

cout << "The site " << m_name << " has " << m_servers.size()
    << " servers and supports " << m_protocols.size()
    << " distinct protocols." << endl;

// Generate documentation for all the servers.
vector<Server>::const_iterator s;
for (s = m_servers.begin(); s != m_servers.end(); ++s)
    (**s).document();

// Generate documentation for all the protocols.
vector<Protocol>::const_iterator p;
for (p = m_protocols.begin(); p != m_servers.end(); ++p)
    (**p).document();
}
```

650

```
void
Server::document()
{
    cout << "Server " << m_name << " has " << m_mailboxes
        << " mailboxes and " << m_diskSpace << " Mb of disk space."
        << endl;
}
```

Fig. 6

Every NT domain has at least one domain controller designated as the 'Primary Domain Controller' or PDC for
short. In this domain the PDC is <<<select server_name from "servers" where PDC = TRUE>>>. Additionally, any
720 — number of servers may operate as backup domain controllers or BDC's.

<<<(if(recordcount("select server_name from "servers" where BDC = TRUE") > 0) ,

730 —— (" In this domain the BDC's are <<<select server_name from "servers" where BDC = TRUE>>>"),
710
("This domain has no backup domain controller and we recomend that one be installed")
740 — >>>

Fig. 7

```
                                              810
    For Each variable do                      /
        switch(variable.type)
        {
            case Server:
                if(Get_Free_Disk_space(variable.name) <
                   (Get_Mailbox_Count (Variable.name) * 5)
820 ————       )
                   Warn_User("Your server has less than 5 megabyte of free disk\\
                              space per mailbox. We recomend increasing disk size.");

if( is_a_PDC(variable.name) and is_an_SQL_server(variable.name))
                   Warn_User("This server is used both as a primary domain controller\\
                              and an SQL database server. You will likely get better\\
                              performance if you dedicate a seperate server for each.")
                break
            case ...
                   .
                   .
                   .
        } //end switch
    Done
```

Fig. 8

Contents

| | | | |
|---|---|---|---|
| 1 | Organization | | 3 |
| | 1.1 Sites | | 4 |
| 2 | Site testlab | | 5 |
| | 2.1 Overview | | 5 |
| | 2.2 Servers | | 6 |
| | | 2.2.1 Server WAYGATE | 6 |
| | 2.3 Connectors | | 15 |
| | | 2.3.1 Internet Mail Connectors | 15 |
| | | 2.3.2 MSMail Connectors | 18 |
| | | 2.3.3 cc:Mail Connectors | 19 |
| | 2.4 Monitors | | 19 |
| | | 2.4.1 Link Monitors | 20 |
| | | 2.4.2 Server Monitors | 20 |
| | 2.5 Directory Store | | 22 |
| | 2.6 Information Store | | 22 |
| | 2.7 Protocols | | 23 |
| | | 2.7.1 HTTP | 23 |
| | | 2.7.2 NNTP | 23 |
| | | 2.7.3 IMAP | 24 |
| | | 2.7.4 POP3 | 24 |
| | | 2.7.5 LDAP | 25 |
| | 2.8 MTA Site Con̈guration | | 25 |

Fig. 11

Chapter 1

Organization

This documentation of the Microsoft Exchange organization ecora has been prepared at the request of Eric Grabowski on Thursday, December 09, 1999 16:23:10. The text was generated by the ecora.com Documentor version 1.0.0.

All Microsoft Exchange servers are organized hierarchically as follows: one or more servers make up a *site*, one or more sites make up an *organization*.

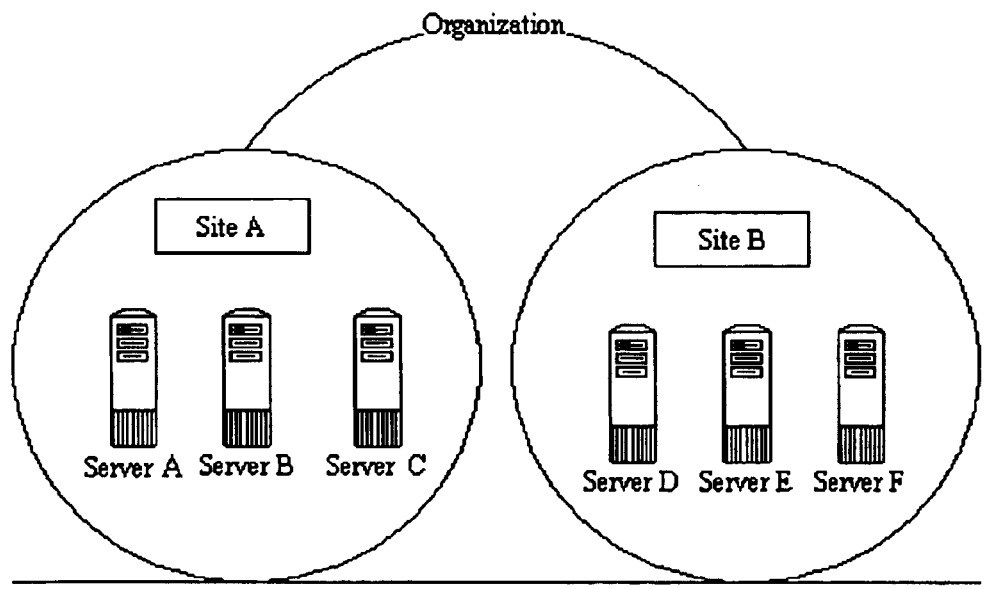

Organization ecora is composed of one site, testlab.

An organization may separate its global address list (GAL) into several parts using a mechanism called *Custom Views*.

For the organization ecora there are no custom views available.

Fig. 12

- This IMS will not convert all incoming mail to a fixed width font. Converting fonts to fixed width will convert all mail into the Courier font.

- The Internet Mail Service will not use *Extended TURN* (ETRN) for mail queue requests. ETRN is a protocol used for requesting email from an SMTP server. Unlike POP3 or IMAP, SMTP was not designed to be used as a client to receive mail or to send mail directly to the end user. Instead, it is designed to work through an agent such as POP3 or IMAP to deliver mail. ETRN (and TURN) allows mail to be "de-queued" or unloaded from the SMTP server, so that the mail can be handled by the appropriate mail server and delivered to its proper recipients.

2.3.2 MSMail Connectors

The Microsoft Mail Connector is designed to allow for easy migration from the MSMail environment to the Microsoft Exchange environment. This connector also allows the two email systems to co-exist with minimum hassle or conversion issues.

There are some clear advantages to using the MSMail connector even if you do not plan on doing a migration right away. The MSMail connector's MTA is much more robust than the MSMail external program used to move mail between post offices. Also, Exchange has much better reporting and logging features than MSMail does.

MS Mail Connector (WAYGATE)

The MSMail connector allows communication between Microsoft Exchange and MS mail. This connector is used primarily for migrating from MSMail to Exchange, but can also be used to provide limited co-existence between the two systems.

An administrator's mailbox does not exist. The administrator's mailbox needs to be defined in order to receive messages concerning this connector. If your MSMail connector is an important part of your Exchange environment it may be a good idea to have these alerts go to a well-monitored mailbox.

Maximum MSMail compatibility has been enabled for this connector. If this option is enabled, OLE objects in mail will be saved in two formats. One format supports older MSMail clients, while the other format supports newer clients.

Message tracking is not enabled on this connector. When message tracking is enabled, the System Attendant on the Microsoft Exchange Server maintains message activities in a log. The mail-tracking log is stored in

AUTOMATIC DOCUMENTATION OF CONFIGURABLE SYSTEMS BY OUTPUTTING EXPLANATORY INFORMATION OF CONFIGURATION PARAMETERS IN A NARRATIVE FORMAT AND CONFIGURATION PARAMETERS DIFFERENCES

The present invention relates to computer systems in general, and more particularly to systems and methods generation and management of automatic documentation for configurable computerized systems.

BACKGROUND OF THE INVENTION

Collaborative configurable systems are computer software systems, computer hardware systems or combinations thereof, wherein a system behavior is controlled and modifiable by a set of configuration data. Examples of such systems include, (but are not limited to), database management systems, electronic messaging and mail software and servers, electronic commerce systems, computer operating systems, (especially multi user system such as Unix® or Microsoft Windows NT®), database management systems, configurable network equipment such as routers switches, and the like. Those systems may comprise a single computer or multiple, interconnected computers, known as multi-server systems.

Configuration data is a collection of configuration parameters and data objects that control and modify at least a portion of the configurable system behavior. Complex configurable systems typically have a large number of such configuration parameters, often ranging in the hundreds and sometimes thousands of parameters. Often cross-dependencies are observed, where a change of one parameter will cause unforeseen and unintended system behavior requiring change to other pararmeters. Configuring such systems is difficult, and requires a high level of knowledge, skill and experience. The problem becomes exponentially more complex when several such systems are connected together, for example a number of cooperating computer servers, distributed e-mail servers, distributed database systems, and cooperating network switches and routers or any other distributed configurable system. In those cases, changing a parameter on one system may even disrupt the operation of another.

Due to the complexity involved in the configuration, once configured, the configurable system becomes a system of its own merit, a special case separate from the general case of the generic non-configured system. While the configured system behavior may be constructed and understood using documentation for the generic system combined with configuration data, such construction is time consuming and often wasteful and expensive. Therefore it is highly desirable to document the specific case of every instance of the configured system separately, in order to ease maintenance and troubleshooting, as well as to facilitate knowledge transfer to new personnel, and generally increase operational efficiency.

Generating such documentation is an extremely tedious job that often requires a highly trained professional to perform. Since the configuration of such systems changes with time, the task is a continual one, taxing information technology personnel. And thus automatic generation of such documentation as shown by the present invention is clearly advantageous. In these specifications, the word "automatic" and its derivative means an operation that is, or may be, created or coordinated primarily by a machine or a computer, especially as compared to chores and tasks that were formerly done primarily by human labor. In an automatic documentation generation step for example, little or no manual user intervention is necessary. Manual intervention implies steps such as manual data entry of configuration parameters, repeated text entries, etc.

Constraint programming (alternatively referred to as "constraints-based reasoning", or "constraint satisfaction") is a technique, most appropriate for computer use, which is based on creating a model of a problem in terms of the requirements for a solution. By defining acceptable values to variables and constraints that define and optionally quantify the allowed relationships among the values assigned to variables, a formal representation of the problem is produced. Standard constraints programming methods can use this representation to find a solution to the problem. The technique also offers an efficient approach to problem solving by making inferences on possible solutions. The technology is well known in the art. By way of example, constraints programming was used as an aid to system configuration as described in U.S. Pat. No. 5,708,798 to Lynch et al. and in PCT/US97/21218 to Elfe et al. Constraint programming easily lends itself to diagnostics and also to the automatic documentation process described herewith.

While most configurable systems provide means for reading and printing the system configuration data, a distinction should be drawn between raw configuration data and documentation. Raw configuration data often relates to a single system in a multi-system environment, and is mostly a cryptic list of variable names with their associated values, with little if any explanation of their meaning. An excellent example of raw configuration data may be found in Windows® Registry, which is a common configuration space for the Microsoft Windows® operating systems. Documentation on the other hand, is an organized collection of knowledge that, separately or in combination, represents the state or configuration of a system, teaches system operation, and aids in troubleshooting. Documentation is characteristically constructed of complete sentences in a human readable language, with appropriate punctuation, paragraph and optionally section separation. Typically, documentation also includes access tools such as a table of contents (TOC) or an index to further ease access to specific sections of the data Generally, documentation also attempts to explain the meaning behind the configuration parameters, optionally including the relationships between multiple systems and the meaning of several key parameters and their effect on system operation. Another optional feature of documentation is the ability to propose configurable parameter values for sample systems, or, in the case of the current invention, the system being documented. Optionally, drawings depicting the condition and interrelationship between the described system elements further enhance the documentation. It should also be noted that documentation is characterized primarily by its content and organization, and not by the medium on which it is presented. Thus documentation may be printed on paper, viewed or edited on a computer screen by the likes of a word processor or a World Wide Web browser, etc. Whether viewed on a computer screen or printed on paper, documentation helps preserve and manage the knowledge accumulated in an organization. It thus increases operational efficiency, helps educate new members, and aids in problem solving and design for future expansion.

There are currently several aids to grouping and displaying raw configuration data relating to computer systems. One such example is available from MessageWise® in Ottawa, Ontario, Canada. This system reads configuration data from several Microsoft Exchange servers, and places them in a database. Queries can then be placed against the data to find answers to specific question. However the MessageWise system does not provide a well-documented meaning of a textual and visual description, organized in an easily read document as described above.

Another configuration data collection tool named Emap and distributed by Microsoft® Corporation of Redmond Wash., provides a graphical representation of connections between exchange servers in an organization. Similarly, several products allow representing an organizational data or voice network by drawings representing the network structure. These types of products are exemplified in U.S. Pat. No. 5,926,463 to Ahern et al.

None of the above solutions provide documentation as described earlier in these specifications. All lack the effects and efficiency of teachings that a well organized textual and visual document provides, and thus do not provide the dept of knowledge preservation and knowledge management provided by such documents. It is clear therefore that there is an unfulfilled need in the industry to provide automated documentation generation, re-generation, and management tools for highly configurable systems.

SUMMARY OF THE INVENTION

It is therefore a goal of the current invention to provide a method and a system for automatic generation of documentation for computerized configurable systems.

The embodiments of the invention derive documentation from a combination of generic system knowledge and the configuration data of a specific system instance, such as one or more configured systems. They thus retrieve or gather, configuration parameters into a computer, and the computer selects predetermined explanatory text segments corresponding with relevant configuration parameters. (Retrieve, collect or gather are used interchangeably in this application and in this context of gathering configuration parameters from a configurable system). The computer outputs the selected text segments together with the corresponding parameters, thus forming a document specific to the configurable system. Preferably, the output is divided into sections and paragraphs where the parameter or a group of parameters, associated with a specific segment or paragraph is outputted in proximity to each other. Furthermore, the current invention preferably groups similar interrelated parameters and their associated text segments in proximity to each other.

Text selection is generally done by a template, implemented by any convenient method. The template will generally include placeholders for the configuration variables and their values, and optionally drawings and other explanatory material. The template may be implemented as a collection of text stored in a file, embedded within the program code, or in a database. Alternatively or in combination, the template may comprise text segments included as print statements that are selectively executed according to specific system configurations and other environmental conditions such as system location, ownership data and the like. These specifications relate interchangeably to different methods of producing a document from predetermined text segments merged with configuration parameters, as utilizing a template. Specific embodiments may use different methods as a matter of technical choice.

Preferably, the invention also automatically generates tools to ease the access to the information in such a document. Preferably, the invention provides a table of contents (TOC) detailing the relative locations of certain sections of the document. More preferably, an index of selected parameters and sections in the document is also provided, detailing their relative locations. Both the table of contents and the index may be adapted best to the document media, for example a printed TOC and index when the document is printed on paper, and alternatively hyperlinks or other computerized access methods may be used when the documentation is viewed on computer screen.

The invention is easily adaptable for various types of configurable systems having configurable parameters accessible by computer, especially for configurable software applications. Listed below are but a small sample of the systems and system types for which the invention is especially adaptable and beneficial: electronic messaging and mail delivery systems such as Microsoft Exchange® (Microsoft Corp, Redmond, Wash.), computer operating systems such as Microsoft Windows NT® or Windows 2000® and different varieties of the Unix® operating systems, groups of computers such as one or more Windows NT domains. Similarly, complex database management systems such as DB2® (IBM Corp, Armonk N.Y.), Informix® (Informix, Menlo Park, Calif.), or Microsoft SQL Server®, and groupware applications like Lotus Notes® (Lotus Corp, Cambridge, Mass.) and GroupWise® (Novell Corp., Provo, Utah) all lend themselves to being documented by the present invention. Additional examples of configurable systems that may benefit from the current invention include electronic commerce applications, enterprise management systems such as SAP® (SAP AG, Waldorf, Germany), BAAN (BAAN Corp, Barneveld, Netherland) and Peoplesoft® (Peoplesoft, Pleasanton, Calif.) and enterprise storage systems such as $EMC^2$® (EMC Corp, Hopkinton, Mass.) and Legato® (Legato Corp, Palo Alto, Calif.), and network nodes such as Cisco® routers (Cisco Corp, San Jose, Calif.).

Preferably, embodiments of the invention generate documentation by retrieving the configuration data of one or more configurable systems and providing a computer readable set of rules describing knowledge about the system. The rules has embedded in them a set of acceptable values associated with specific configuration parameter(s). The invention then compare the values of configuration parameters against the values expressed in the associated rules, and output an error or warning condition if a parameter violates those rules. The acceptable values may be fixed in the rule, or alternatively, may be computably modified based on portions of the configuration parameters. In addition to acceptable values, the program may also include indications of desired values that may be outputted as needed.

A method for providing the set of rules and the knowledge functionality as described above may be provided by a computer readable generic data model of the configurable system. The generic model corresponds to the interrelationship of the sub-components of the configurable system and thus reflects its underlying structure. After the configuration data is retrieved from the configured system, an instance model is constructed in accordance with the generic model. Optionally, the generic model incorporates the system knowledge described above, and includes sets of acceptable values and other interrelationships between the system sub-components. Preferably the system knowledge is implemented utilizing constraints programming logic and techniques, which allows for fast and efficient checking of a complex set of requirements, and easy flagging of error conditions. The generic model also facilitates the creation of a document that is organized in a manner most closely related to the structure of the configurable system, and further enhances the readability and reduces the time required to comprehend the system.

In a preferred embodiment of the invention, the raw data is parsed by a data parser program module, entered into a database, and merged into a unified or segmented text template. Rules are then coded into the program to specify values, method of computing values or locations of finding the appropriate values, against which the configuration parameters of the sampled system may be checked. This method allows the user to change the presentation of the document by embedding the results of queries against the database into the document in ways the user best believes will enhance system understanding or troubleshooting. Using such a database is advantageous due to the simplicity and low cost of the implementation.

An alternative object of the current invention is to provide identification of any configuration mismatches or potential problems in a configuration and to flag those conditions to the user. Optionally, optimization suggestions may be made based on the quantification of different aspects of the configuration data and the generic system knowledge.

Another alternative object of the invention is to provide means of comparing current and previous configurations and to point out differences between them. Such comparisons are useful during the troubleshooting of a system, which malfunctions due to unknown reason. By comparing an old, "known good" configuration with the current configuration, differences become apparent and, due to the documentation generating nature of the current invention, such changes may easily be placed in context and thus aid in determining if any of the modified parameters may have caused the malfunction.

It should be pointed out specifically that the invention, with its several capabilities, applies to multi-server configurable systems as well as single server configurable systems. This is a clear advantage since, as mentioned earlier, the system complexity grows exponentially with the number of servers. Examples of such multi-server environments are a plurality of server computers operating under the Windows NT operating system within a single domain, or multiple communicating domains with or without trust relationships. Another example is one or more Microsoft Exchange electronic mail servers in an organization. Similar in nature is a set of co-operating configurable network nodes such as routers, switches, concentrators, frame relay access devices, and other nodes comprising a data or voice network.

It should also be noted that the invention may be integrated within the configurable system itself, either as an integral part of the system software or by having a separate program active on a computer that is a part of the configurable system.

The system operates generally by collecting configuration data from individual systems or from system sub-components that comprise the configurable system to be documented. Preferably, a collector program is deployed to collect the configuration data. A collector program is a program constructed to collect configuration data from one or more configurable systems, and is constructed specifically for each platform or configurable system and collects the raw data for transmission into a Documentor. The configuration data is then preferably encrypted (especially in the case of transmitting the data over the Internet) before being transmitted to the Documentor.

A Documentor, (alternatively referred herein as a Documentation Server) is a computer program that receives configuration data as its input and generates documentation as its output, primarily when receiving the data from a configurable system and generating documentation pertaining to the system. It performs this function by outputting a template, or pre-determined text segments relating to configuration parameters or to a group of inter-related configuration parameters. The text segments of which the document is comprised are primarily explanatory in nature and are composed to improve the understanding of meaning and effects of the configuration parameters to which they relate. Optionally, drawings and tables are also outputted as needed to increase the understanding and readability of the produced document. The drawings, tables, and text segments are outputted to paper, a computer screen, the Internet, or any other appropriate output device or method. Additionally the Documentor may output the document to a computer file.

In one alternative embodiment for a Documentor, a generic operational model is provided. The operational model embeds therein information and knowledge which is required for a proper generic system operation, and may be viewed as a set of generic implementations of operational configurations specific to the generic system. The generic model therefore, details the underlying structure of the interrelationships between different sub-components of the generic case of the configurable system. Each allowable configured system is a subset of the generic configurable system. Similarly, each model of a configured system constructed according to the generic model is a subset of the generic model that reflects the configured system underlying structure as configured. Such specific models of configured systems are called "instance models".

Currently it is believed that such model is best created utilizing constraints programming, wherein the knowledge is expressed as a set of constraints on the system's configuration parameters. However as will be seen below, other, less complex methodology may be applied, both to model creation and to the primary goal of automatic documentation generation, without detracting from the invention. In a constraints-based implementation, the collection of configuration data is examined in light of the constraints expressed in the generic model and is entered into an instance model. Once completed, the instance model is a representation of the specific instance of is the configurable system as configured.

Parameters that violate constraints are flagged as an error, and may or may not be entered into the instance model. Optionally, parameters may be assigned values according to the level into which they fit the generic model, and such values may be utilized later to propose changes to optimize the configurable system.

In one preferred embodiment, the collector program is downloaded onto a computer connected to the configurable system. The program then collects configuration data from all relevant individual systems comprising the configurable system. The data is transferred via the Internet to the Documentor that processes the configuration data and prepares the documentation. The documentation is then made available to the user over the Internet. Optionally, the collector program may be operated from within a World Wide Web browser and starts operating automatically after being downloaded.

In a most preferred implementation, a documentation server comprising the collector program and the Documentor portion is coupled to a local area network or an Intranet that is in communication with the configurable system to be documented. An Intranet is one or more interconnected computer networks that are characterized by being primarily within the electronic bounds of an organization. Typically electronic access to an Intranet is not open to the general public, and it thus affords a protected computing environment for storing and accessing organization confidential data. Many Intranets utilize Internet like technologies, and some utilize communications provided by public communication means, for example, a dedicated line in a PSTN network. However data access to an Intranet is controlled from within the owning organization.

Coupling a documentation server directly to an Intranet overcomes a disadvantage of an Internet coupled server by maintaining the configuration data within the organization-controlled network. In an Internet coupled server the data, even if encoded and encrypted, may present a security risk for certain configurable systems. An Intranet coupled documentation server, especially when implemented as a dedicated computer, becomes a Documentation Appliance, operating within the confines of an organization. The Documentation Appliance is readily available to company personnel, offers local system documentation and storage of previous configurations, all while avoiding the need to send sensitive data over public networks.

Such a Documentation Appliance is preferably a dedicated server that may be adapted for documenting one or more types of configurable systems. It is also preferable to have such a Documentation Appliance keep logs of document production and that such logs will be remotely accessible to ease debugging and service. The Appliance may be coupled directly to the configurable system or may utilize an intermediary computer.

A Documentation Appliance server attached to an organization Intranet may also be configured to retrieve the configurable system configuration information according to a pre-determined schedule, and activate updated documentation production automatically. Together with the capability to compare previous and current sets of configuration parameters, a Documentation Appliance may thus produce a list of changes that occurred between activations, in effect to create a log, tracking modifications and changes in the configurable system.

There are clear advantages to accessing the documentation via a computer. To facilitate that, the invention also provides for a World Wide Web type server that is constructed to distribute the documents produced by the current invention to a web browser. Since the documentation in the preferred implementation is produced by a print engine capable of producing HTML, the integration of a web server within the appliance allows any person with access rights to browse, search and view the documentation as needed.

In yet another embodiment of the present invention the program code required for performing the steps required for creating the document may be integrated into the configurable system itself. In such an embodiment the configuration data is already available to the document generation module. The document generation module comprises primarily of a text template, implemented as program code, text segments, or any other convenient manner, and program code to merge the configuration data within such template and output the template with merge data as a document. The program code may be integrated into the configurable system as an integral part of the configurable system code or may be implemented as an add-on module loaded and executed by the configurable system. Other embodiment details may also be integrated within the configurable system as described below.

BRIEF DESCRIPTION OF THE DRAWINGS

This invention may be better understood from the descriptions and claims which follow, and from the accompanying drawings in which:

FIG. 5 is a partial and simplified 'C++'-like code of several classes used in model creation in one preferred embodiment.

FIG. 6 depicts 'C++'-like code of two 'document' methods referred to in FIG. 5 classes.

FIG. 7 depicts an example of a simplified portion of text template for another preferred embodiment of the present invention.

FIG. 8 is partial pseudo code showing a method for generating warning messages to the user according to the present invention.

FIG. 11 depicts a partial sample of a table of contents for a document generated in accordance with the present invention.

FIG. 12 depicts a partial sample of documentation generated in accordance with the present invention.

FIG. 13 depicts another partial sample of documentation generated in accordance with the present invention.

DETAILED DESCRIPTION OF THE INVENTION

Figure 1:
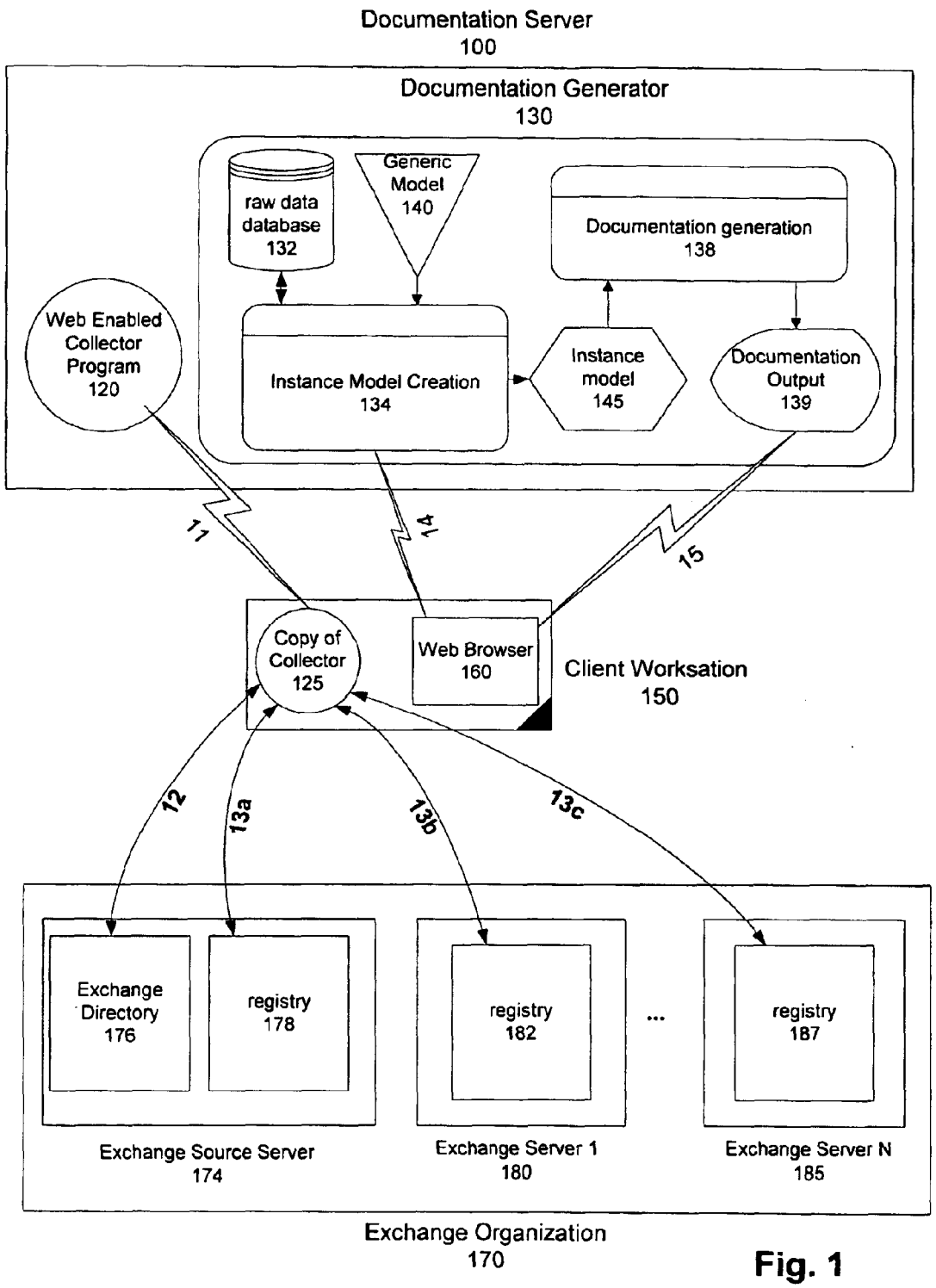
FIG. 1 depicts a general schematic component and data flow diagram of a preferred embodiment of the invention

This invention will be explained with reference primarily to Microsoft Exchange® and Windows NT® platforms by way of example only. Microsoft Exchange is a popular electronic mail server (hereinafter "Exchange"), and Microsoft Windows NT is a popular operating system (hereinafter "NT" or "Windows NT" interchangeably). It will be clear however to those skilled in the art that primarily the platform specific data need to be modified in order to modify the documentor portion of the invention to handle other types of configurable systems. Such platform specific data includes appropriate text sections and appropriate constraints or rules to define the underlying structure and the acceptable variable values and relationships. Similarly, it will be clear that while the collector portion of the current invention is platform and application specific, adapting the collector program described in this application to operate in a specific platform is a matter of common skill.

In its most basic form, the invention involves a database containing a set of predetermined text sentences or paragraphs, associated with at least one specific variable. A collector program is provided for reading configuration parameters from a configurable system, and the associated text paragraph is outputted together with the configuration parameters. Optionally entries are made in a table of contents for text paragraphs, and the table of contents is outputted as well. The output may be to a printer, a screen, or a file. Output may also utilize the World Wide Web technology to offer organized access to the documentation, in which case the table of contents is best composed of hyperlinks to appropriate sections. Another alternative output forms include audio and video output. An audio output may be generated by a text to speech translation module. Video output require a video template, similar to the text template described herein, but adapted for video signals and for embedding external values such as configuration parameter values, in a predetermined video stream.

As noted above, the invention may also be practiced by integrating the steps described herein into the configurable system code. For example, a module may be integrated into a Microsoft Exchange server that will retrieve all configuration parameters directly from the Exchange system within which it operates. Alternatively, a Documentor program may be operated on a computer that is a part of the configurable system. For example, a Documentor program may be operated on a computer utilized as a Windows NT domain controller, where much of the configuration data is locally available in a system adapted for documenting a Windows NT environment. The document generation steps described herein are similar with the primary difference being the location where certain portions of the invention are executed.

While novel and useful even at this basic level, the invention further benefits the user by grouping similar features and/or variables together, for example listing all domain controllers in an NT domain, or creating a list of all mail transfer agents (MTA) scheduled to run in an Exchange organization, including their prospective protocols or schedule. Optionally, the Documentor portion may collect similar information from multiple servers. So, for example, replication information between database servers may be listed together to ease understanding of the proper propagation order. Such information will preferably be grouped in close proximity with several paragraphs explaining the process of propagation and the meaning of each of the related variables. As further explained below, utilizing constraints or rules eases verification of proper configuration.

The preferred implementation will contain general data explaining the generic operation of the configurable system, together with system specific data as configured. Preferably, generic and specific advice relating to configuration will be placed in proximity to system information relating specifically to the system being documented.

For an explanation of the operation of the invention, reference is now made to the drawings, depicting preferred embodiments of the invention, shown here for illustrative purposes only, primarily for operation on a Microsoft Exchange platform.

In FIG. 1 the documentation server 100 in a preferred implementation is located remotely to the client Exchange organization 170. The documentation server 100 is connected to Exchange organization 170 via the Internet or an Intranet. A client workstation 150 is the intermediary between the documentation server 100 and the Exchange organization 170. It will be clear however, that the client workstation 150 may be an integral part of the Exchange organization 170 or even an Exchange server per se, such as 174, 180 or 185. The client workstation 150 enables access to the Exchange servers with sufficient access rights to allow a program running thereon to access the required configuration data in the registry and in the Exchange directory. Additionally, in this preferred implementation, the client workstation should have an operational web browser 160 from which documentation production operations may be initiated.

The exchange organization depicted in FIG. 1 is a generic organization having at least one Exchange Source Server 174, and any number of servers, only two of which are shown, designated as 180 and 185. The Exchange directory 176 resides on the source server 174.

Utilizing the process begins with a client creating a connection from client workstation 150 to the documentation server 100 via the web browser 160. The client than downloads 11 a copy 125 of the collector program 120 to the client workstation. In this preferred embodiment the collector program is constructed as an ActiveX® program or a Java® (Sun Microsystems, Palo Alto, Calif.) program, and the copy of the collector 125 begins operating automatically after it was downloaded.

Figure 2:
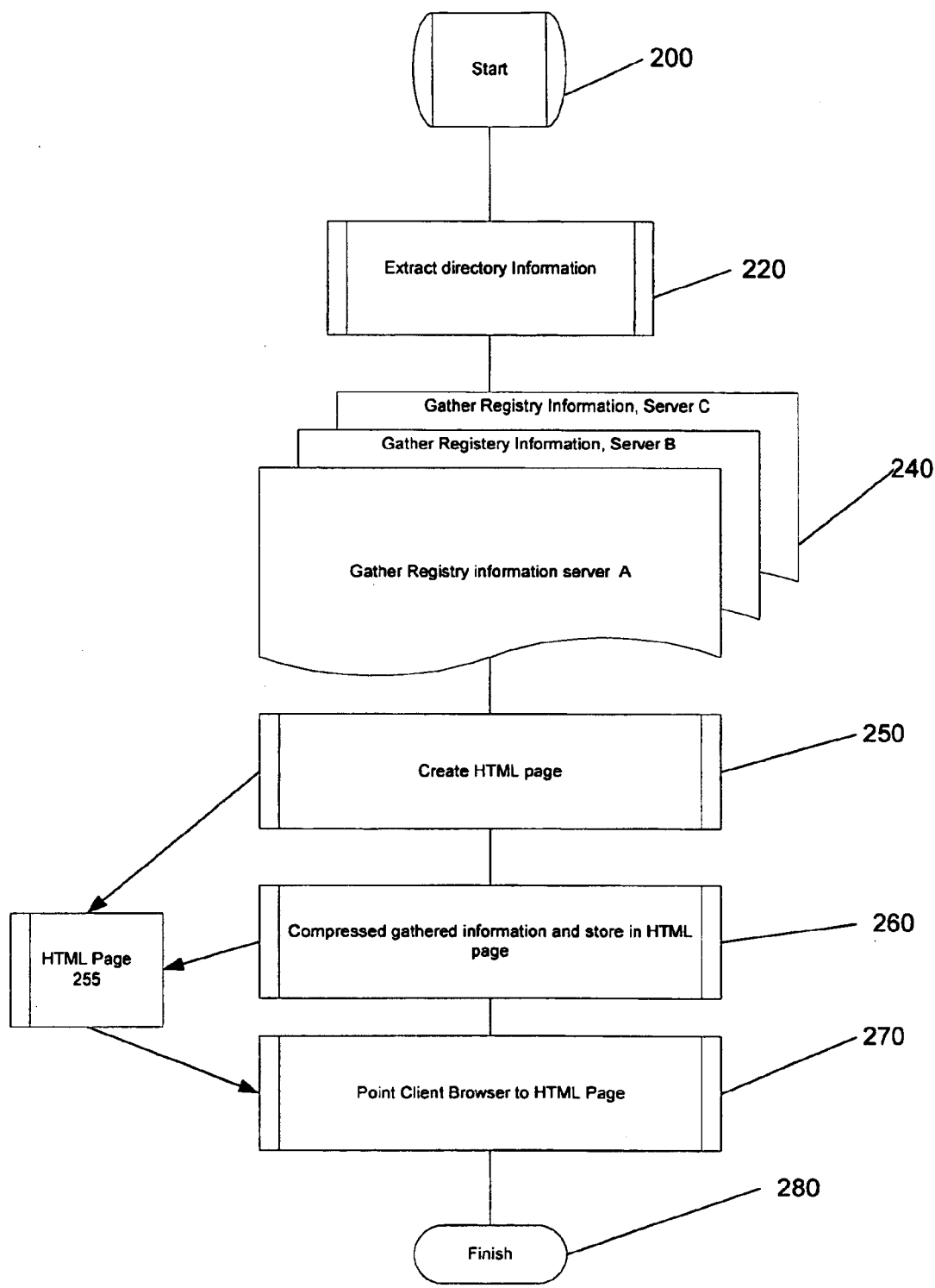
FIG. 2 is a generalized flow diagram of the collector program portion of an embodiment of the invention.

FIG. 2 depicts the operation of the collector program. After program initialization 200, the collector program 125 connects to the Exchange Source Server 174 as depicted in step 12 in FIG. 1, and extracts 220 the Exchange Directory information 176. Next, the collector program proceeds to extract 240 registry data 178 from the Exchange Source Server 174 in step 13, and retrieves registry data 182 and 187 for all other Exchange servers in the organization, as shown in steps 13a, b . . . n in FIG. 1. Clearly, while FIG. 1 shows only three servers, this depiction is for explanation purposes, and the number of servers may vary from one to any number supportable by the configurable platform. For increased efficiency, the steps of collecting the configuration data from the various servers in steps 13b through 13n are carried out simultaneously.

Figure 10:
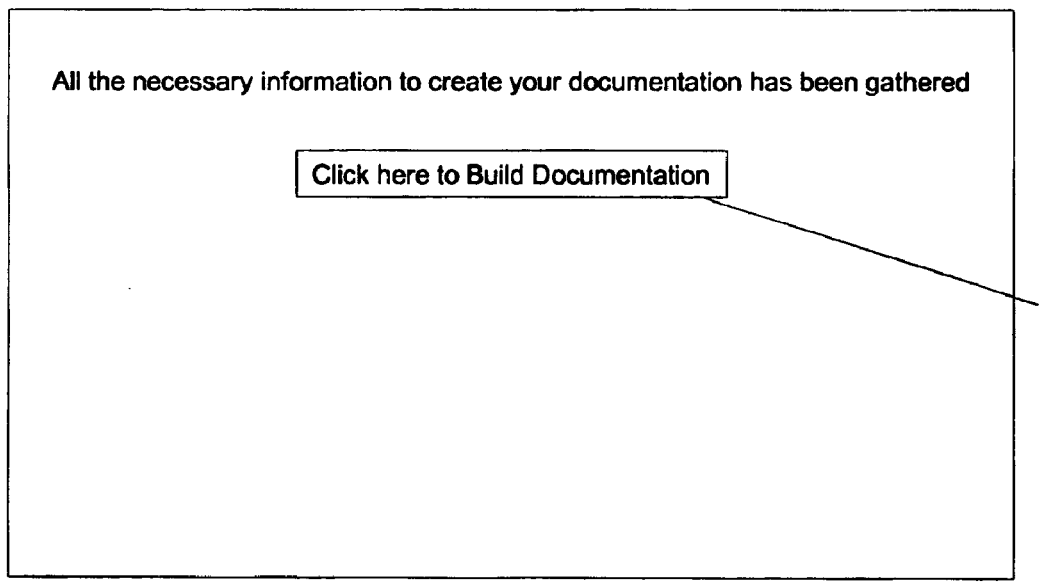
FIG. 10 is a screen depiction of an HTML page prior to sending collected data to documentation browser.

Collector program 125 then creates 250 an HTML page 255, compresses the data collected in steps 12 and 13a . . . n, and encodes 260 the data for compatibility with transmission using the HTTP protocol. The data is than embedded in HTML page 255, preferably as hidden text. The collector program 125 than loads HTML page 255 into web browser 160, and points 270 client web browser 160 to the page 255. An example of the HTML page 255 when acted upon by the web browser as depicted in FIG. 10. The user is given the option, by activating button 1010, to send the data to documentation server 100.

While the mechanism of collecting the configuration data shown in steps 220 and 240 is described uniquely as applicable to Exchange environment, those steps constitute the mechanics of collecting configuration information specific to the platform. The function of automatic collection of the configuration data may be performed by any known means without departing from the invention. Adaptation of the collector program described above for different platforms requires only regular programming skills and general knowledge of the platform. Alternatively, the collector program may be constructed to operate through other communication and collecting methods such as SNMP for network nodes, in which case no HTML communications is required and is often unavailable. In the case of the Documentation Appliance, the collector program may be implemented as a collector program module operating on the Appliance, with the configuration data retrieved directly from the configurable system by the module.

Figure 3:
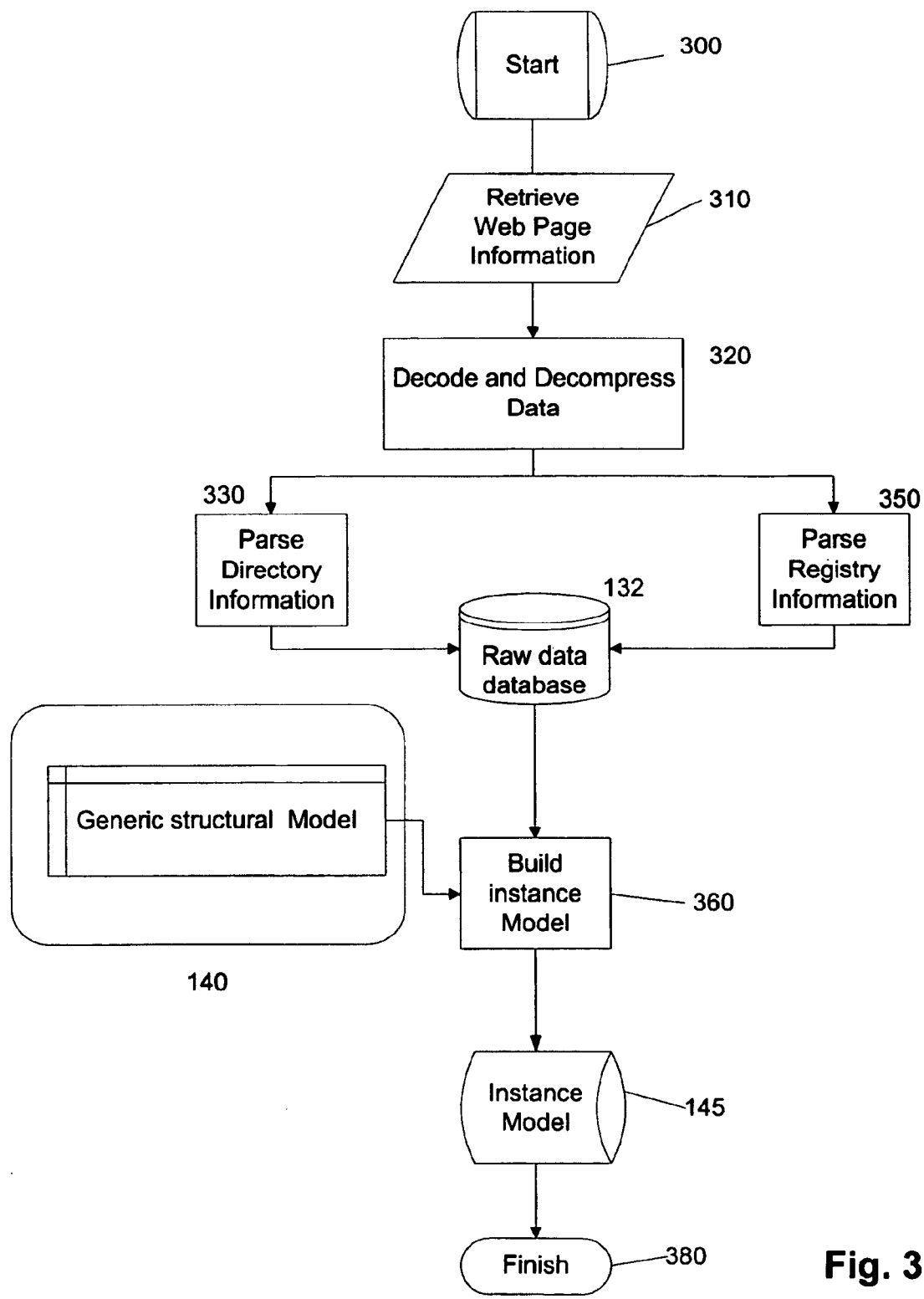
FIG. 3 is a flow diagram for generating an instance model in accordance with the invention

FIG. 3 details the operation of instance model creator 134. The model creation happens within the document generator 130. Once the user sends the data embedded in HTML page 255 to the documentation server 100, the program retrieves 310 the information from the web page, decodes and decompresses 320 the data. The data is then parsed into variable names and corresponding values in steps 330 and 350. The raw data is stored in a database 132. Doing so allows easy approach to different data views as needed. The parsed data is then presented, one variable at a time, to step 360 in which an instance model is created.

In a preferred embodiment the instance model 145 is an object-oriented artifact assembled from instances of predefined object types described in a generic model 140 that is incorporated into the documentation server 100.

The generic model 140 for a specific application domain (e.g., Microsoft Exchange, SAP database, or a specific computer operating system) consists of a set of classes describing objects available in the configurable system universe. Thus, generic models are specific to a particular configurable system domain: for example, at least one generic model is provided for Microsoft Exchange, while another one is provided for Windows NT, and so on.

Each type of object in the configurable system universe that is relevant to the task performed by the current invention is represented in the generic model in the form of a class. The class describes its composition (in terms of lower level objects) and structure (in terms of relationships among its components, e.g. Part-Of, Is-A, etc.). Optionally, behavior can also be expressed as part of the model, in the form of additional relations among constituent parts and/or attributes, describing correct and/or faulty functioning.

By way of example, in a Windows NT domain, there will be a library object describing a server, and certain server characteristic parameters such as name, version information, and the like. Constraints may be attached to each of those variables, for example a constraint that the domain name has to be the same for the server as for the whole domain is needed to verify that the domain is consistent. However more complex requirements, for example communications capability between servers, require that a whole class of objects dealing with network communications be enabled and consistent. Such structural demands comprise the structural generic model 145, together with a set of constraints that are applied to this underlying structure. By adopting the generic model and the object library to specific platforms, such as mail servers, operating systems, network equipment, etc., the documentation server 100 can be modified to operate on various platforms.

A partial example of several objects relating to a model for the Microsoft Exchange platform is shown in FIG. 5 in 'C++'-like notation. By way of example, class 'Organization' 510 is the root of the model, and comprises internal attributes such as the organization name 511, and other subservient objects comprising the rest of the organization model. In this example, the vector of subservient objects is of type 'Site' shown as 516. The class Organization 510 also incorporates several methods. The posting step described below is carried out in the method 'post' 512. Rules or constraints applied to the object to check the validity of the object against the generic model are applied using the 'validate' method 513, and the method 'document' 515 is used to create the documentation that is specific to the configurable system instance.

Examining class Site 520 shows a close similarity to class Organization 510 above, with the major structural differences being the members included in the class. While the Organization class 510 included a vector 516 detailing a list of sites, each Site object details a list of Server objects 526 and a list of Protocols objects 524 with similar collection of methods. In class Server 530 we see a similar pattern yet again. Class Protocol 540 also incorporates similar methods, but being a leaf of the hierarchical model structure, it does not include any vector of inherent objects connected thereto. It will therefore be clear to any person familiar with the organization and operation of the Microsoft Exchange software, that the construction shown in FIG. 5 represents not only a collection of objects of the types described above, but also the underlying structure of a Microsoft Exchange installation. It will also be clear that similar constructs may be created for other configurable systems such as a Windows NT domain, a network organization, Lotus Notes software, database servers etc.

In the process of instance model creation 360, each applicable configuration variable is examined against the generic model. In this step, known as the 'post' or 'posting' step, an object instance is created for each relevant configuration variable. Variables that conform to the generic model and pass the constraints imposed on the instance object are posted in the instance model. Posting occurs in an object-oriented manner that maintains a structural semblance to the underlying principles defined in the generic model for the platform as described above.

Constraints may be divided primarily into two categories: hard and soft constraints. Hard constraints are such that a violation thereof may prevent the system from operating, while soft constraints are mainly related to performance issues, and a violation of such soft constraints will allow the continued system operation, albeit in less than optimal manner. Whether a constraint is a hard or soft, is particular to each constraint and is responsive to the value of one or more variables. Additionally, as is well known in the art, constraints may be quantitative, and assign values corresponding to a level of conformance with the generic model. For example, such values are utilized for providing the user with suggestions and warnings related to optimizing the configurable system performance and/or to modifications required for maintaining optimal system operational status.

Figure 4:
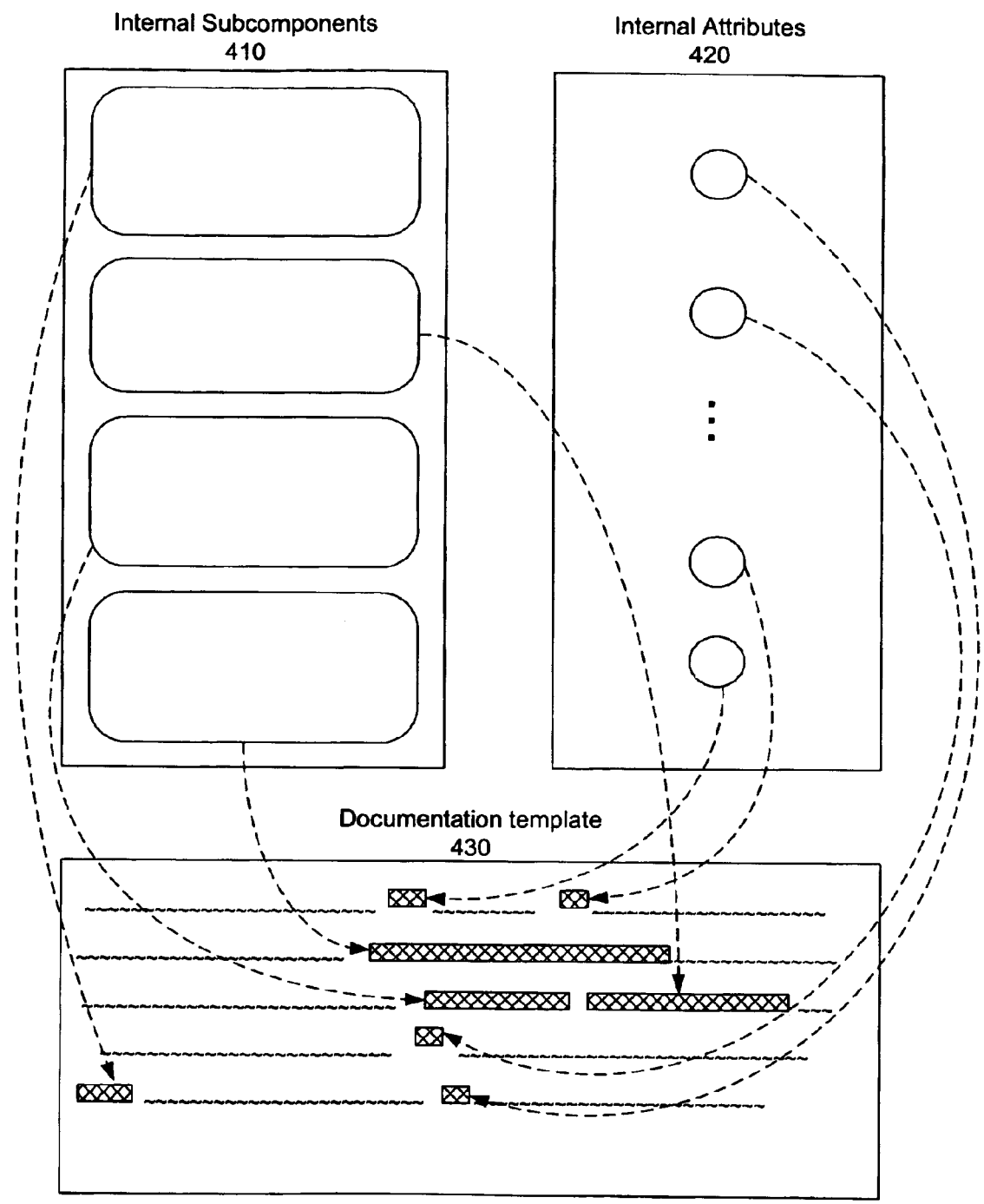
FIG. 4 depicts a generic model object in accordance with an embodiment of the present invention.
Figure 9:
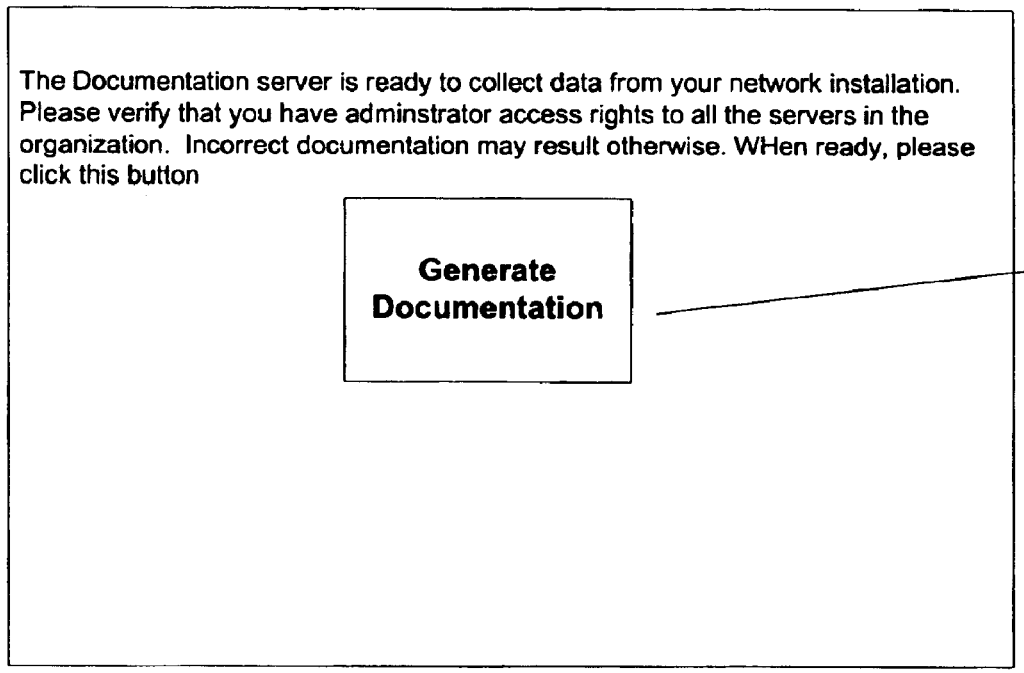
FIG. 9 is a screen depiction of web based screen from which the documentation operation begins.

FIG. 4 presents a simplified view of the document construction carried out in the document generation module 138 portion of the documentation generator 130. A documentation template 430 describing and explaining different aspects of the system is created and stored in the documentation server 100. The template may be stored in separate files, as part of the model, or as data available to the documentation generator 138 in any convenient format. Internal attributes and sub-components are integrated into the template as needed. FIGS. 12 and 13 are sample documentation pages, while FIG. 11 is a sample of a table of contents; all generated by the current invention. As can be observed in FIGS. 12 and 13 drawings may also be embedded in the template.

FIG. 6 is a partial listing of a computer program, written in a 'C++'-like language. The numeral 610 designates a simplified sample of the 'document' method 525 code of an object of class 'Site' 520. The method uses the 'C++' standard output stream 'cout'. Portions of the documentation template 430 are embedded in the first output statement 613 in the form of text strings like "The site" 618. The output statement 613 also includes internal attributes 420 such as the variable 'm_name' 615 and sub-components 410 such as the method 'm_servers.size( )' 617. Additionally, the method calls other documenting methods in all servers in its 'm_servers' lists seen in 614 and all protocols in its 'm_protocols' list as seen in 616. While simple attributes such as 'm_name' are outputted directly from class members or global variables, other outputs occur from methods internal as well as external to the method. Since each 'document' method dictates the order in which the subservient objects print, a very orderly and well-organized document can easily be produced. Attention is also called for the 'endl' statement 619 at the end of the cout statement 613, which is an example of the formatting information imparted by the program. More complex formatting, merging information, tables and drawings may be incorporated from such predetermined data or taken from files external to the program to be merged in the output document.

FIG. 6. Also shows a method of generating the table of contents or TOC. Statement 611 supplies the-current location in the output stream to a procedure named TOC_Entry, which stores the context and associated location for further generation of the table of contents. Similarly, the procedure "Index_Entry( )" provides the index context, in the example the site name and the location within the output document. If for example the standard output stream 'cout' statements is redirected to one computer file, both the TOC and index generating procedures simply output the indexing information into one or more separate index files. Generating an index and TOC from such files is a simple procedure, and the TOC and index may be created according to the viewing method, e.g. by hyperlinks that are dynamically generated when the document is read on screen, or by printing the information when the document is reproduced on paper.

FIG. 6 also shows another example of the document method common to most if not all nodes in the model. In the 'Server::document' method 650 output statement 660 generates documentation output without calling any external method.

In a preferred implementation, the output produced by the Documentor is a set of printing instructions for a virtual printing machine. Using specific drivers, the documentor is then able to produce documentation in different formats such as HTML, Postscript, PCL, Latex®, Adobe Acrobat® Microsoft Word® document, or any other desired format. The language for the virtual printing machine contains, among other constructs, commands for describing the document layout, such as chapter, section, subsection, and similar constructs. Those commands automatically create the appropriate entry in the optional TOC and index. Other commands for the virtual printing machine include commands for specifying document composition, such as structured elements such as tables and bulleted lists, and/or unstructured elements such as paragraph, note, warning, and hints. Additional virtual printing machine commands include formatting instructions like vertical/horizontal space, indentation justification and the like, as well as font management functions such as color, bold, italic, etc.

The virtual printing machine is implemented using object oriented programming techniques, which provides a multiplexer class. Implementing the commands described above in a manner similar to the standard 'C++' stream manipulators and overloading the '<<' operator, from the point of view of the Documentor, the multiplexer class is used the same way as standard 'C++' streams. The virtual printing machine also provides several driver classes, one for each type of format or formatting language. Each class implements the translation of the printing commands to the target formatting language.

A simplified description of the output process is as follows: The Documentor creates one multiplexer instance to which it attaches instances of drivers for all the required types of output. Every time the documentor uses the output '<<' operator, the desired information or printing construct is sent to the multiplexer which distributes it to all the drivers currently attached to it. Each driver than creates an output according to its specific formatting language. The drivers also create the table of contents and index in a desired manner that fits the formatted output, such as HTML style hyperlinks for an HTML document or as formatted and printable TOC and index for paper output.

Optionally, the invention may further use the raw data database 132 to allow user specified view of data specific to the configurable system in question. The raw data database may best be managed by a database management system against which queries may be posted, and in which the data retrieved forms the basis for the view. The creation of such a view will allow generating partial documentation, for example detailing the entire information specific to a single subnet in a network. This allows users to concentrate on limited areas of interest; for example, a network under direct supervision of a specific user. This feature may be further enhanced by the addition of pointers from the database to related objects in the instance model, since only the relevant portion of the instance model can easily be created as separate documentation with grouping of similar parameters in stored separate subsections of the model. Query results may also be embedded in the output document either according as predetermined by the template or according to user preferences, in a system that includes a user interface portion to accept user input for selecting document generation options.

Figure 14:
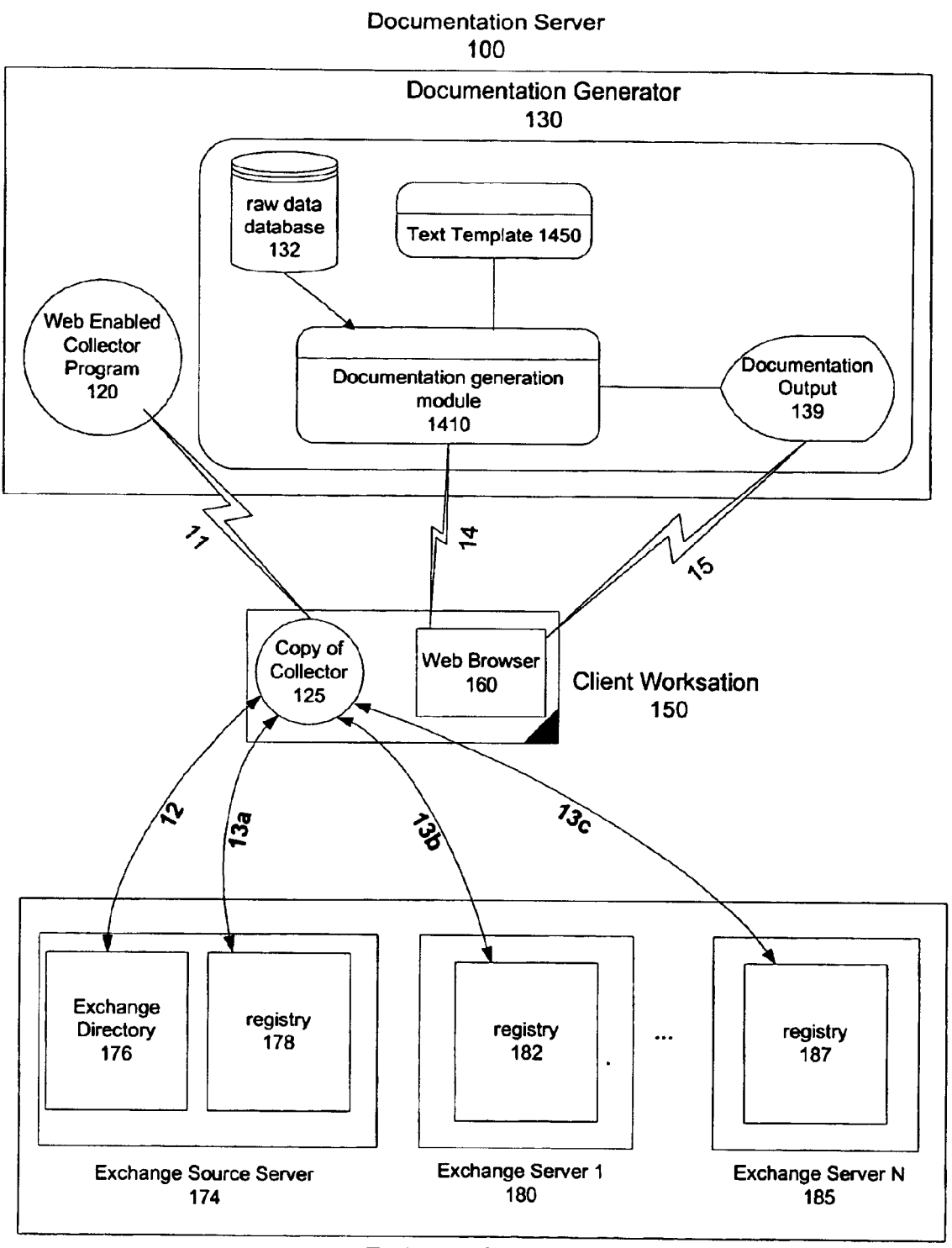
FIG. 14 depicts another schematic implementation of the invention utilizing a database and a text template in accordance with the present invention.

In a simpler embodiment of the present invention depicted generally in FIG. 14, the process of document generation does not include constraint-based model creation. In such an embodiment the raw data is placed in raw data database 132 and is associated with parts of the documentation, (or text segments) that form template 1450 that correspond to the variables relevant to the documentation of the configurable system. Alternatively, template 1450 may be a predetermined document template, which includes placeholders for the results of specific queries such as the names of all servers, name of all domain controllers, etc. A documentation generation module 1410 reads the template, and when a query is encountered, it is parsed, presented to the database 132 and the results outputted to the document by a documentation generation module 1410. FIG. 7 presents a simple portion of a template to generate partial documentation for a Windows NT domain. Queries to the database 710, 720 and 730 are enclosed between character strings '<<<' and, '>>>'. When the documentation generation module 1410 encounters a query such as 710, it parses the query and the results are inserted into the output stream. The documentation generation module 1410 can also parse constructs such as variable name resolution and substitution, and an if statement as shown in 720, and decide which of the two statements 730 or 740 to output. The example depicted in FIG. 7 shows a simple but effective method to automatically generate elaborate documentation from the collected configuration data without the use of a complete object oriented model.

Optionally, a simple error checking and reporting routine may also be incorporated, in which a collection of rules is stored in the program and relevant variables are checked against those rules. FIG. 8 depicts a pseudo-code portion of such rule-checking program.

In accordance with FIG. 8 an example 810 of such rules is to warn the user 820 if the number of mailboxes on the server multiplied by the desired mailbox disk space allocation, (or 5 MB in this example) is smaller than the available disk space. The rule may further be constructed to issue warning or error messages, or to propose more fitting values for a parameter based on the value of one or more parameters. For example, the rules or constraints may compute and output a suggestion to modify the size of a virtual memory disk swap file in response to actual RAM memory and available disk space in a server operating under Windows NT. Such proposed values may be based on an arbitrarily complex set of computations emanating from the configuration parameters or based on general system knowledge and experience.

Another objective of the current invention was previously described as comparing current with previous configurations of the configurable system to aid in troubleshooting. This objective is easily achieved by storing an older model or raw configuration data of an operational system. When a problem is observed in the configurable system operation, a present model or raw data set is collected and the new and old set of configuration data or model may be compared to each other. Outputting variables with different values between the two configurations will allow consideration of only those variables that have been modified, and thus will ease troubleshooting of the system as presently configured.

Figure 15:
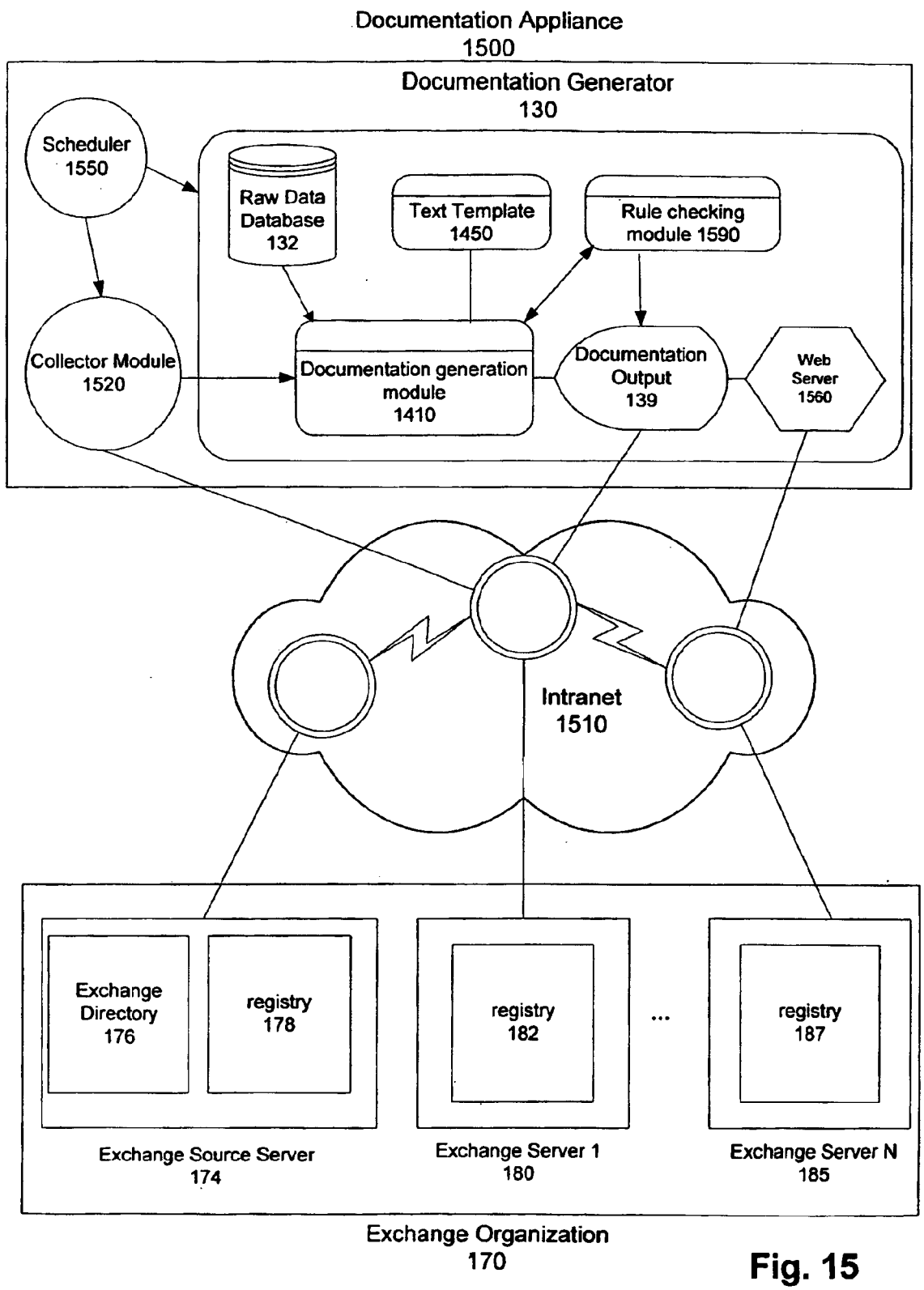
FIG. 15 depicts a simplified diagram showing connection method of a documentation appliance in accordance with the present invention.

FIG. 15 depicts the Documentation Appliance described above. While the methods of document generation are similar to the methods already described, the Documentation Appliance 1500 utilizes a collector module 1520 to perform the configuration data retrieval directly from the configurable system. The documentation appliance is also connected to an Intranet 1510 that comprises one or more interconnected networks and that is coupled to the configurable system as depicted by the Exchange Organization 170. Optionally, the documentation appliance also incorporates a web server 1560 to distribute the documentation to other computers. Optionally a scheduler 1550 is provided to activate the documentation generation according to a predetermined schedule.

Once the documentation is generated with a computer readable main body and a table of contents, additional capabilities, such as searching and editing, may be easily added to the features of the current invention as is well known in the art.

While there have been described what are at present considered to be the preferred embodiments of this invention, it will be obvious to those skilled in the art that various other embodiments, changes, and modifications may be made therein without departing from the spirit or scope of this invention and that it is, therefore, aimed to cover all such changes and modifications as fall within the true spirit and scope of the invention, for which letters patent is applied.

What is claimed is:

1. A method for automatic production of documentation for configurable computerized systems, comprising the steps of:

retrieving configuration parameters having values associated therewith, from a configurable system;

outputting explanatory information corresponding to at least one of said configuration parameters and a value associated with said parameter;

organizing said explanatory information, based on at least one of a content of said information and said value associated with said parameter, into a narrative format descriptive of a configuration of the configurable system, the narrative format constituting the documentation, or a portion of the documentation, for said configurable system;

storing a first set of configuration parameters from a configurable system;

storing a second set of configuration parameters from a configurable system; and outputting differences between said first and second sets of configuration parameters.

2. The method of claim 1 further comprising the step of automatically selecting said explanatory information by said computer, in accordance with said configuration parameters.

3. The method of claim 2 wherein said step of selecting is being performed by a software module integrated into said configurable system.

4. The method of claim 2 wherein said step of retrieving is performed using a collector computer program operating on a first computer, and collecting said configuration parameters from said configurable system, wherein said step of selecting is performed by a second computer.

5. The method of claim 4 further comprises the step of transferring said configuration parameters from said first computer to said second computer via the Internet.

6. The method of claim 4 further comprising the step of downloading said collector program onto said first computer.

7. The method of claim 6 further comprising the step of automatically activating said collector program after said step of downloading.

8. The method of claim 6 further comprising the step of initiating said step of downloading from within a World Wide Web Browser.

9. The method of claim 1 wherein said configurable system is at least one selected from a group consisting of a configurable software application, a computer operating system, an electronic messaging system, a database management system, a mass storage platform, file server system, a network router, and a network switching device.

10. The method of claim 1 wherein said configurable system is at least one selected from a group consisting of an organization, a server, a domain, an operating system, a mass storage system, an enterprise management system, database management system, and a server database management system.

11. The method of claim 1 wherein said configurable system is an enterprise management system.

12. The method of claim 1 wherein said configurable system is a messaging system.

13. The method of claim 1 wherein at least a portion of said explanatory information is grouped in accordance with interrelationship between configuration parameters corresponding to said portion of said explanatory information.

14. The method of claim 1 further comprising the steps of:

a) providing a computer readable set of rules, at least one of said rules having a range of acceptable values associated with one or more configuration parameters for said configurable system; and, b) comparing said retrieved configuration parameters against said set of rules.

15. The method of claim 14 further comprising the step of outputting an indication of error conditions if at least one of said configuration parameters violates one or more of said rules.

16. The method of claim 14 wherein at least one of said rules also comprise indications of desired values for said associated parameter, and further comprising the step of outputting information conveying said desired values.

17. The method of claim 16 wherein said desired values are computably modifiable.

18. The method of claim 1 wherein said step of retrieving is preformed using a collector computer program that collects said configuration parameters from said configurable system.

19. The method of claim 18 further comprising the step of activating said collector computer program from within a World Wide Web browser.

20. The method of claim 18 wherein said collector program is an ActiveX program.

21. The method of claim 18 further comprising the step of constructing said collector program using the Java programming language.

22. The method of claim 1, wherein said explanatory information is arranged in a template having placeholders embedded therein, said method further comprising the step of merging the values associated with said configuration variables with the template in accordance with said placeholders.

23. The method of claim 1 wherein said step of outputting further comprises embedding one or more drawings within said document.

24. The method for claim 1 further comprising the step of storing said retrieved configuration parameters in a database adapted to store one or more sets of configuration variables, and retrieve portions of one or more said sets in response to queries.

25. The method of claim 24 further comprising the step of embedding results of queries within said document.

26. The method of claim 1 wherein said computer is integrated into said configurable system.

27. The method of claim 1 wherein said step of outputting is being performed by a software module integrated into said configurable system.

28. The method according to claim 1, wherein said explanatory information comprises text segments.

29. A method for automatic production of documentation for configurable computerized systems, comprising the steps of:
retrieving configuration parameters having values associated therewith, from a configurable system into a computer;
outputting explanatory information corresponding to at least one of said configuration parameters and a value associated with said parameter in a narrative format descriptive of a configuration of the configurable system, to form the documentation or a portion thereof;
constructing a table of contents for said documentation, or a portion thereof;
storing a first set of configuration parameters from a configurable system;
storing a second set of configuration parameters from a configurable system; and,
outputting differences between said first and second sets of configuration parameters.

30. The method of claim 29 wherein said configurable system is at least one selected from a group consisting of a configurable software application, a computer operating system, an electronic messaging system, a database management system, an enterprise resource planing system, a mass storage platform, file server system, a network router, and a network switching device.

31. The method of claim 29 wherein said configurable system is an enterprise management system.

32. The method of claim 29 wherein said configurable system is a messaging system.

33. The method according to claim 29, wherein said explanatory information comprises text segments.

34. A method for automatic production of documentation for configurable computerized systems, comprising the steps of:
retrieving configuration parameters having values associated therewith, from a configurable system into a computer;
outputting explanatory information corresponding to at least one of said configuration parameters and a value associated with said parameter in a narrative format descriptive of a configuration of the configurable system, to form the documentation or a portion thereof;
generating an index of at least selected parameters of said configuration parameters, and said explanatory information, said index detailing relative location of at least one of said selected parameters and at least a portion of said explanatory information within said document;
storing a first set of configuration parameters from a configurable system;
storing a second set of configuration parameters from a configurable system; and
outputting differences between said first and second sets of configuration parameters.

35. The method according to claim 34, wherein said explanatory information comprises text segments.

36. A system for automatic production of documentation for configurable computerized systems, comprising:
a first computer having data communication capability;
means for retrieving configuration parameters from a configurable system and communicating said parameters into said first computer;
means for generating explanatory information specific to said configurable system in accordance with said configuration parameters;
means for organizing said explanatory information, based on at least one of a content of said explanatory information and values associated with said configuration parameters, into a narrative format descriptive of a configuration of the configurable system, the narrative format constituting a documentation, or a portion of said documentation, for said configurable system;
means for outputting said documentation; and
means for storing at least a first and a second set of said configuration parameters,
wherein said means for outputting said documentation is further adapted to output difference between said first and second set.

37. The system of claim 36 wherein said means for retrieving comprises a computer program executed on a second computer coupled to said configurable system and wherein said first computer is in communication with said second computer via a data network.

38. The system of claim 36 wherein said communication is conducted by means of the Internet.

39. A computer readable media containing software that when executed by a computer will cause said computer to substantially perform as the system of claim 36.

40. The system according to claim 36, wherein said explanatory information comprises text segments.

41. A system for automatic production of documentation for configurable computerized systems, comprising:
a) a collector computer program adapted to retrieve configuration parameters from at least one configurable system;

b) a documentation generator program, comprising:
  i. a template having explanatory information and place holders indicating placement of one or more configuration parameters;
  ii. a data parser in communication with said collector program, said parser adapted to parse said configuration parameters into associated values and merge said values into said template; and
  iii. an output module adapted to organize said explanatory information, based on at least one of a content of said explanatory information and said values associated with said configuration parameters and to output said template with said merged values in a narrative format descriptive of a configuration of the configurable system, to form the documentation or a portion of said documentation, for said at least one configurable system,
wherein said system is further adapted to store at least a first and a second set of said configuration parameters and to output difference between said first and second set.

42. The system of claim 41 further comprising a set of acceptable values for at least one of said configuration parameters and wherein an error condition indication is outputted if the value of a configuration parameter violates said acceptable values.

43. The system of claim 41 further comprising a database and a database management system for storing said configuration parameters, and wherein said database management system is adapted to respond to queries and output a portional view of said configuration parameters for output into said document.

44. The system according to claim 41, wherein said explanatory information comprises text segments.

45. A method for automated production of documentation for configurable computerized system, comprising the steps of:
  downloading a collector computer program to a first computer which is in communication with a configurable system;
  collecting configuration parameters from said configurable system using said collector program;
  transmitting said configuration parameters into a second computer having a documentation generator program operable thereon;
  outputting, using said documentation generation program, a document in a narrative format descriptive of a configuration of the configurable system, comprising:
    i. explanatory information, regarding at least a portion of said configuration parameters;
    ii. said portion of said configuration parameters; and
    iii. a table of contents detailing relative location of at least certain segments of said explanatory information;
  storing a first and a second set of configuration parameters; and
  comparing said first set and second set and outputting differences therebetween.

46. The method of claim 45 wherein said configurable system is at least one selected from a group consisting of a configurable software application, a computer operating system, an electronic messaging system, a database management system, an enterprise resource planning system, a mass storage platform, file server system, a network router, and a network switching device.

47. The method of claim 45 wherein said configurable system an enterprise management system.

48. The method of claim 45 wherein said configurable system is a messaging system.

49. The method according to claim 45, wherein said explanatory information comprises text segments.

50. A method for automatic production of documentation for configurable computerized systems, comprising the steps of:
  coupling a computer with at least a portion of a configurable system via a network;
  retrieving configuration parameters having values associated therewith, from said configurable system into said computer;
  outputting explanatory information corresponding with at least one of said configuration parameters and a value associated with said parameter;
  organizing said explanatory information, based on at least one of a content of said information and said value associated with said parameter, into a narrative format descriptive of the configuration of a configurable system, the narrative format constituting the documentation, or a portion of the documentation, for said configurable system;
  storing a first set of configuration parameters from a configurable system;
  storing a second set of configuration parameters from a configurable system; and
  outputting differences between said first and second sets of configuration parameters.

51. The method of claim 50 further comprising the step of automatically selecting said explanatory information by said computer, in accordance with said configuration parameters.

52. The method of claim 50 wherein said step of retrieving is performed using a collector computer program coupled to said configurable system.

53. The method of claim 50 further comprising the step of constructing said collector program using the Java programming language.

54. The method of claim 50 further comprising the step of automatically retrieving said configuration parameters in accordance with a predetermined schedule.

55. The method of claim 50 wherein said computer is adapted to produce documentation for a plurality of configurable systems.

56. The method of claim 50 wherein said configurable system is at least one selected from a group consisting of a configurable software application, a computer operating system, an electronic messaging system, a database management system, a mass storage platform, file server system, a network router, and a network switching device.

57. The method of claim 50 wherein said configurable system is at least one selected from a group consisting of an organization, a server, a domain, an operating system, a mass storage system, an enterprise management system, a database management system, and a server database management system.

58. The method of claim 50 wherein said configurable system is an enterprise management system.

59. The method of claim 50 wherein said configurable system is a messaging system.

60. The method of claim 50 wherein at least a portion of said explanatory information is grouped in accordance with interrelationship between configuration parameters corresponding to said portion of said explanatory information.

61. The method of claim 50 further comprising the steps of:
  c) providing a computer readable set of rules, at least one of said rules having a range of acceptable values associated with one or more configuration parameters for said configurable system; and, d) comparing said retrieved configuration parameters against said set of rules.

62. The method of claim 61 further comprising the step of outputting an indication of error conditions if at least one of said configuration parameters violates one or more of said rules.

63. The method of claim 61 wherein at least one of said rules also comprise indications of desired values for said associated parameter, and further comprising the step of outputting information conveying said desired values.

64. The method of claim 63 wherein said desired values are computably modifiable.

65. The method of claim 50 wherein at least a portion of said explanatory information is grouped in accordance with interrelationship between configuration parameters corresponding to said portion of said explanatory information.

66. The method of claim 50 wherein said step of outputting further comprises the step of embedding one or more drawings within said document.

67. The method of claim 50 further comprising the step of communicating said document to another computer by means of a World Wide Web server.

68. The method for claim 50 further comprising the step of storing said retrieved configuration parameters in a database adapted to store one or more sets of configuration variables, and retrieve portions of one or more said sets in response to queries.

69. The method of claim 68 further comprising the step of embedding results of queries within said document.

70. The method according to claim 50, wherein said explanatory information comprises text segments.

71. A method for automatic production of documentation for configurable computerized systems, comprising the steps of:

coupling a computer with at least a portion of a configurable system via a network;

retrieving configuration parameters having values associated therewith, from a configurable system into a computer;

outputting explanatory information, corresponding with at least one of said configuration parameters and a value associated with said parameter, in a narrative format descriptive of a configuration of the configurable system, to form the documentation or a portion thereof;

constructing a table of contents for said documentation, or a portion thereof;

storing a first set of configuration parameters from a configurable system;

storing a second set of configuration parameters from a configurable system; and outputting differences between said first and second sets of configuration parameters.

72. The method of claim 71 wherein said computer is coupled via an Intranet to at least one configurable system selected from a group consisting of a configurable software application, a computer operating system, an electronic messaging system, a database management system, an enterprise resource planning system, a mass storage platform, file server system, a network router, and a network switching device.

73. The method of claim 71 wherein said configurable system is at least one selected from a group consisting of a server, an operating system, a mass storage system, an enterprise management system, a database management system, and a server database management system.

74. The method according to claim 71, wherein said explanatory information comprises text segments.

75. A method for automatic production of documentation for configurable computerized systems, comprising the steps of:

coupling a computer with at least a portion of a configurable system via a network;

retrieving configuration parameters having values associated therewith, from a configurable system into a computer;

outputting explanatory information, corresponding with at least one of said configuration parameters and a value associated with said parameter, in a narrative format descriptive of a configuration of the configurable system, to form the documentation or a portion thereof; and maintaining an activity log detailing operations of said steps of retrieving and outputting;

storing a first set of configuration parameters from a configurable system;

storing a second set of configuration parameters from a configurable system; and outputting differences between said first and second sets of configuration parameters.

76. The method according to claim 75, wherein said explanatory information comprises text segments.

77. A method for automatic production of documentation for configurable computerized systems, comprising the steps of:

coupling a computer with at least a portion of a configurable system via a network;

retrieving configuration parameters having values associated therewith, from a configurable system into a computer;

outputting explanatory information, corresponding with at least one of said configuration parameters and a value associated with said parameter, in a narrative format descriptive of a configuration of the configurable system, to form the documentation or a portion thereof;

generating an index of at least selected parameters of said configuration parameters, and said explanatory information, said index detailing relative location of at least one of said selected parameters and at least a portion of said explanatory information within said document;

storing a first set of configuration parameters from a configurable system;

storing a second set of configuration parameters from a configurable system; and outputting differences between said first and second sets of configuration parameters.

78. The method according to claim 77, wherein said explanatory information comprises text segments.

79. A system for automatic production of documentation for configurable computerized systems, comprising:

a computer adapted to be coupled to a configurable system via a network;

means for retrieving configuration parameters from said configurable system into said computer;

means for generating explanatory information specific to said configurable system in accordance with said configuration parameters;

means for organizing said explanatory information, based on at least one of a content of said explanatory information and values associated with said configuration parameters, into a narrative format descriptive of a configuration of the configurable system, the narrative format constituting a documentation, or a portion of said documentation, for said configurable system;

means for outputting said documentation; and means for storing at least a first and a second set of said configuration parameters, wherein said means for outputting said documentation is further adapted to output difference between said first and second set.

80. The system of claim 79 wherein said means for retrieving comprises a computer program executed on a second computer coupled to said configurable system and wherein said computer is in communication with said second computer via an Intranet.

81. The system according to claim 79, wherein said explanatory information comprises text segments.

82. A system for automatic production of documentation for configurable computerized systems, comprising:
   a) a computer coupled to said configurable system via a network;
   b) a collector program module operated on said computer and adapted to retrieve configuration parameters from at least one configurable system;
   c) a documentation generator program module, comprising:
      i. a template having explanatory information and place holders indicating placement of one or more configuration parameters;
      ii. a data parser in communication with said collector program module, said parser adapted to parse said configuration parameters into associated values and merge said values into said template; and
      iii. an output module adapted to organize said explanatory information, based on at least one of a content of said explanatory information and said values associated with said configuration parameters, and to output said template with said merged values in a narrative format descriptive of a configuration of the configurable system, to form the documentation or a portion of said documentation, for said at least one configurable system,
   wherein said system is adapted to store at least a first and a second set of said configuration parameters and to output difference between said first and second set.

83. The system of claim 82 further comprising a set of acceptable values for at least one of said configuration parameters and wherein an error condition indication is outputted if the value of a configuration parameter violates said acceptable values.

84. The system of claim 82 further comprising a database and a database management system for storing said configuration parameters, and wherein said database management system is adapted to respond to queries and output a portional view of said configuration parameters for output into said document.

85. The system of claim 82 further comprising a World Wide Web server adapted to communicate said documentation to another computer.

86. The system according to claim 82, wherein said explanatory information comprises text segments.

87. A method for automated production of documentation for configurable computerized system, comprising the steps of:
   retrieving configuration parameters from a configurable system, into a computer that is in communication with said configurable system via a network;
   selecting explanatory information in accordance with said configuration parameters;
   outputting, in a narrative format descriptive of a configuration of the configurable system, a document comprising:
      i. said explanatory information;
      ii. values associated with said configuration parameters; and
      iii. a table of contents detailing relative location of at least certain segments of said explanatory information;
   storing a first and a second set of configuration parameters; and
   comparing said first set and second set and outputting differences therebetween.

88. The method of claim 87 wherein said configurable system is selected from a group consisting of a configurable software application, a computer operating system, an electronic messaging system, a database management system, an enterprise resource planning system, a mass storage platform, file server system, a network router, a network switching device, or a combination thereof.

89. The system of claim 87 further comprising a World Wide Web server adapted to communicate said documentation to another computer.

90. The method according to claim 87, wherein said explanatory information comprises text segments.

91. A self documenting configurable system, comprising:
   a) explanatory information related to said configurable system;
   b) at least one software module constructed to
      i. merge a plurality of configuration parameters of said configurable system with corresponding portions of said explanatory information related to said configurable system,
      ii. organize said explanatory information, based on at least one of a content of said explanatory information and values associated with said configuration parameters, and
      iii. output said explanatory information and said configuration parameters in a narrative format descriptive of a configuration of the configurable system, to form a document specific to an instance of said configurable system,
   wherein said system is adapted to store at least a first and a second set of said configuration parameters and to output difference between said first and second set.

92. The self documenting configurable system of claim 91 wherein said software module is embedded within said configurable system.

93. The self documenting configurable software system of claim 91 wherein said software module is constructed to be integrated into said configurable system while said configurable system is being executed by at least one computer.

94. The system according to claim 91, wherein said explanatory information comprises text segments.

95. A method for automated production of documentation for a configurable software system, having at least a portion of its behavior modifiable by configuration parameters stored in a computer accessible store, said method comprising the steps of:

embedding into said configurable software system a software module constructed to merge configuration parameters and explanatory information associated with said configuration parameters;

retrieving said configuration parameters, said configuration parameters having values associated therewith, from said configurable system into a computer;

outputting explanatory information corresponding with at least one of said configuration parameters and a value associated with said parameter;

organizing said explanatory information, based on at least one of a content of said information and said value associated with said parameter, into a narrative format descriptive of the configuration of a configurable system, the narrative format constituting the documentation, or a portion of the documentation, describing specifically said configurable software system as configured;

storing a first and a second set of configuration parameters; and comparing said first set and second set and outputting differences therebetween.

96. The method according to claim 95, wherein said explanatory information comprises text segments.

97. A self documenting configurable software system having configuration parameters stored in at least one computer data store, comprising:

a) a first software module constructed to retrieve at least a portion of said configuration parameters from said computer data store; and c) a second software module constructed to
        i. merge explanatory information and related parameters of at least said portion of said configuration parameters,
        ii. organize said explanatory information, based on at least one of a content of said information and values associated with said relates parameters, into a narrative format descriptive of the configuration of a configurable system, the narrative format constituting a document, or a portion of the document, containing a description specific to said configurable system, and
        iii. output said document, wherein said system is adapted to store at least a first and a second set of said configuration parameters and to output difference between said first and second set.

98. The system according to claim 97, wherein said explanatory information comprises text segments.

99. A computer readable media containing software that when executed by a computer will cause said computer to substantially perform as the system of claim 79.

* * * * *